March 12, 1963
E. M. GRAHAM
3,080,996
COMBINED HANDLE AND LOCK
Filed April 29, 1960
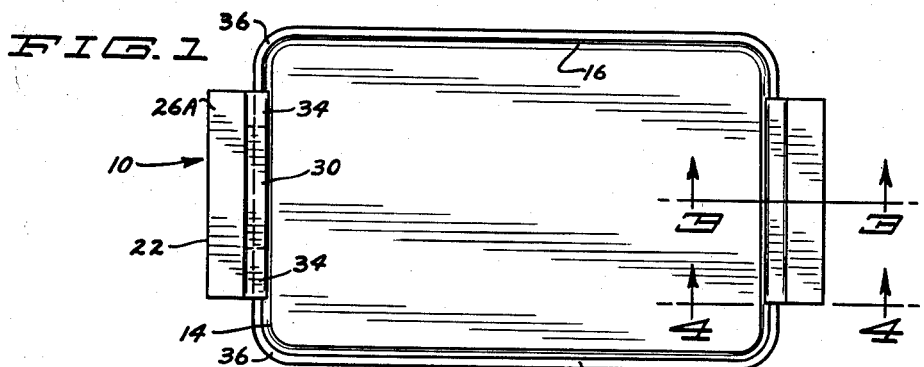
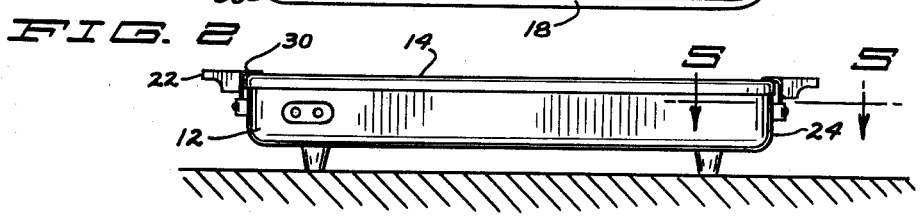
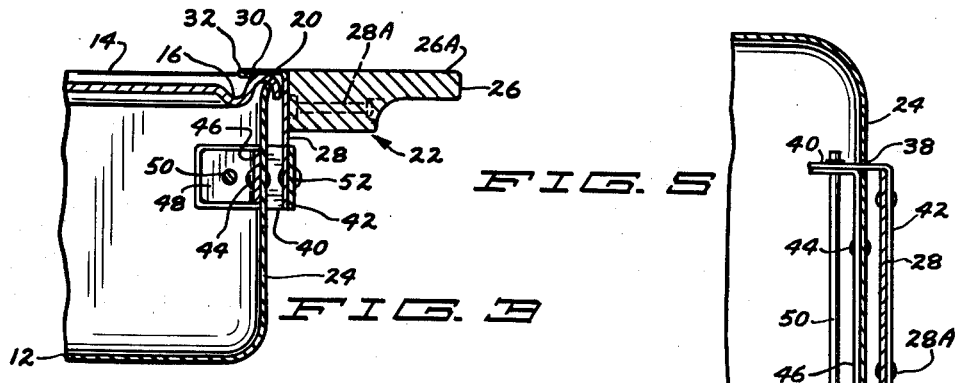
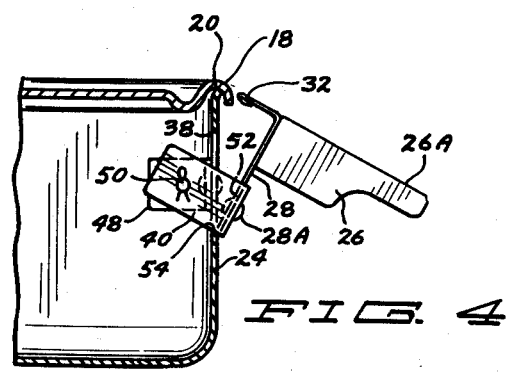
INVENTOR.
ELWOOD M. GRAHAM
BY Carlsen & Carlsen
ATTORNEYS United States Patent Office 3,080,996
Patented Mar. 12, 1963

3,080,996
COMBINED HANDLE AND LOCK
Elwood M. Graham, Hopkins, Minn.
(2900 Emerson Ave. S., Minneapolis 8, Minn.)
Filed Apr. 29, 1960, Ser. No. 25,767
3 Claims. (Cl. 220—55.7)

This invention relates to household appliances and particularly to a combined handle and lock for holding a cover plate on an appliance body.

The present invention is particularly adaptable for use with stainless steel griddles. In such griddles the cooking or griddle plate is usually formed of a relatively thin metal, such as laminated steel having a thickness of 0.050 inch. When the temperature of such a griddle plate having a rectangular shape is changing there are thermally induced stresses which tend to warp the plate at its corners. Accordingly, it is an object of the present invention to provide a combined handle and griddle-plate lock which holds the griddle plate on a grill body such that warpage of the plate is inhibited.

It is another object of the present invention to provide an improved and combined handle and cover-lock for securely keeping the lock in an operative engagement with the plate.

These and other more detailed and specific objects will be disclosed in the course of the following specification, reference being had to the accompanying drawings, in which:

FIG. 1 is a plan view of an electrically heated stainless steel griddle embodying the present invention.

FIG. 2 is a side elevational view of the FIG. 1 griddle.

FIG. 3 is a vertical sectional view taken along the line 3—3 in FIG. 1 and showing the combined handle-lock in operative engagement with a griddle plate and the relationship of the handle-lock pivot axis to the point of locking engagement between the griddle plate and the handle-lock.

FIG. 4 is a enlarged vertical sectional view of one end portion of the FIG. 1 embodiment as taken along the line 4—4 and showing the handle-lock in an unlocked relation to the griddle plate.

FIG. 5 is a horizontal sectional view taken in the direction of the arrows along the line 5—5 in FIG. 2 and showing the constructional details of the handle-lock pivot mount.

Referring now more particularly to the drawings like numbers denote like parts and structures of the various figures. The illustrated and exemplary embodiment of the present invention is used with an electric grill 10 having a rectangular and bowl shaped body 12 which contains the usual resistance heating elements and thermostatic controls, not shown. A stainless steel griddle plate 14 has a formed grease collecting trough 16 and an upwardly-extending and downwardly-opening arcuate edge portion 18 adapted to fit on the upper edge 20 of the body 12 side and end walls. A handle-lock assembly 22 is pivotably mounted about a horizontal axis on each of the body end walls 24 and is pivotable toward the griddle plate 14 for lockingly engaging same as shown in FIG. 3 and pivotable away therefrom to an unlocked position as shown in FIG. 4.

The heat insulating members 26 form the carrying handles for the griddle and may consist of a good quality and decoratively shaped wooden member. A resilient and L shaped latch-member 28 is rigidly attached to the member 26 as by the screws 28A or other equivalent fasteners. A lip portion 30 of the member 28 and having the downwardly crimped end portion 32 is slidable over the plate 14 edge portion 18 for securely engaging same and holding the plate 14 against the upper edge 20 along the respective end walls 24.

Note that the downwardly crimped end portion 32 engages the edge portion 18 on the trough 16 side thereof for providing a detent action to securely hold the handle-lock 22 in the FIG. 3 illustrated locking position. When in said position the member 28 is preferably under strain for holding the plate 14 snuggly against the edge 20.

The lip portion 30 is elongated in the body transverse dimension such that it has two end sections 34 which are respectively somewhat adjacent to the corners 36 of the grill plate 14. These end sections firmly secure the corner portions of the plate to the upper edge 20 of the body 12 thereby resisting the thermal stresses for preventing warpage at the corners. The crimped inward side portion 32 extends the entire length of the lip 30 and as such provides rigidity thereto and in this manner aids in preventing warping in addition to acting as a lock detent. It is preferred that the lip 30 be continuous between the sections 34 for more securely holding the plate on the body and extend at least two-thirds of the body end wall 24 length.

The preferred pivotal mount is best understood with reference to FIGS. 3 and 5. The end wall 24 has two-spaced-apart and vertically-elongated slots 38 through which the respective legs 40 of the U shaped member 42 extend. Inside the body 12 and rigidily attached to the wall 24, as by the rivets 44 or equivalent fasteners, is a relatively heavy U shaped member 46 having two spaced-apart and inwardly extending leg portions 48 the outer surfaces of which are in juxtaposition with the respective slots 38. The pivot rod 50 extends through the apertures 51 in the respective legs 40 and 48 and is held in position by suitable pins or spring clips.

It may be noted in FIG. 3 that the web 42W of the U shaped member 42 is disposed outwardly of the lower leg portion 52 of the L shaped latch member 28. This arrangement permits the lip 30 to have a minimum length which serves to provide a maximum resilient holding force to be exerted downwardly on the edge portion 18. Also, when the latch member is engaging the plate the leg portion 52 of the member 28 may engage the outer surface of the edge portion 18 for limiting the upward pivoting of the handle assembly 22.

As best seen in FIG. 3 the horizontal axis formed by the rod 50 is disposed inwardly of the engagement between the lip 30 and the portion 18. By so providing the illustrated pivot axis relationship to said engagement, the crimped side portion 32 initially engages the edge portion 18 at a substantial angle as shown in FIG. 4 for more easily permitting the lip to slidably engage the plate. Also as noted in FIG. 4 the lip 30 is preferably formed such that when it is disengaged from the plate the inward side portion 32 is somewhat below the upper edge 20 for causing the lip to exert a substantial force downwardly when engaging the plate.

As seen in FIG. 4 the legs 40 will engage the respective lower edges 54 of the slots 38 for limiting the downwardly pivoting of the handle assembly 22. Also as shown in FIG. 4 the lip portion 30 when in its relaxed state, i.e. disengaged from the plate 14, may extend somewhat downwardly with respect to the upper surface 26A of the handle portion 26 such that when the latch member 28 is engaged with the plate 14 the upper surface 26A and the lip 30 are horizontally aligned.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A combined handle and cover-latch for a household device including a body of rectangular shape having a bottom wall, end walls and a rectangular cover plate with an upwardly and then downwardly extending edge portion, said edge portion having a rounded upper surface, said edge portion being engageable with said end walls and said walls having a substantially straight upper edge in a plane parallel to said bottom wall, a handle rotatably mounted at the lower end of each of said end walls about an axis parallel to the plane of said bottom wall, each handle axis also being parallel to the plane of the end wall on which such handle is mounted and said axes being positioned within said body; a resilient lip on the upper end of each said handles and extending inwardly toward the cover plate edge portion such that when disengaged therefrom the lip is slightly below the rounded upper surface of said edge portion, said lip being slidably engageable with said rounded upper surface for sliding thereover as the handle is rotated theretowards, said lip having a depending means positioned adjacent the inward edge thereof for engagement with the inward aspect of said edge portion so as to form a detent and serve to stiffen the lip; and handle gripping members secured to the upper ends of said handle member extending outwardly therefrom whereby the weight of said cover and bowl tends to urge said lip inwardly across said rounded upper surface to the latched position when said device is carried by said handle gripping member.

2. In a household appliance having a rectangular and bowl-shaped body with an opening at its upper periphery and a cover member having an upwardly extending and downwardly opening peripheral edge portion normally engaged on said opening, the edge of said opening being positioned in a horizontal plane, said body having two vertically elongated and laterally spaced apart slots in each of at least two opposing end walls on said body; a first U-shaped and horizontally disposed member inside the body on each of said end walls between said slots, said U-shaped member having a connecting member parallel said end wall and two inwardly extending and apertured leg portions adjacent said slots, the apertures of said leg portions being positioned on an axis parallel said bottom wall and said end walls; a pair of handle assemblies, each including carrying means, a first upwardly extending portion, a resilient portion extending inwardly from the top end of said first portion and including a downwardly depending detent at the inner edge thereof, said detent extending laterally of said first position and serving to tend to inhibit warpage of said cover, a second U-shaped member having a horizontally disposed web rigidly attached to said first portion and two apertured leg portions at the ends thereof and extending through the respective slots so that all of said apertures are in axial alignment; and means extending through the apertures of all leg portions adjacent each end wall for rotatably mounting said handle assemblies.

3. A household appliance comprising a rectangular and bowl-shaped body having a bottom wall, opposed end walls and opposed side walls, said body having an opening at its upper periphery, the edge of said opening being positioned in a plane parallel to said bottom wall, a cover member having an upwardly and then downwardly extending peripheral edge portion normally in engagement with the edge of said opening, said edge portion having a rounded upper surface; a laterally extending pivot socket member secured to the inside of each of said end walls, said pivot socket member having a pivot axis parallel to said bottom wall and said end wall and inside of said body; latch members spaced outwardly of each of said end walls, each of said latch members including means extending through slots in said end walls, said means being secured at the lower end thereof to one of said pivot socket members; a pivot pin positioned in each of said pivot socket members and in engagement with the lower end of said latch members to allow pivotal movement therebetween; a resilient member rigidly associated with said latch member and extending inwardly from the upper end thereof, said resilient member being positioned to slidably engage said rounded upper surface at each end of said cover member; a crimped edge portion at the inward end of each of said resilient members, said crimped edge portion including a member positioned parallel to said pivot member and the plane of said end walls and projecting toward said bottom wall from the lower surface of said resilient member adjacent the inward peripheral edge thereof; a handle member rigidly secured to the upper end of said latch member and projecting outwardly therefrom, an upward force upon said handle member being adapted to slide said resilient member inwardly across said rounded surface of said cover and cause said crimped edge portion to snap into the latched position against the inward edge of said rounded portion of said cover to thereby retain said cover in place upon said body and whereby when said appliance is carried by said handle members the weight of said cover and bowl will urge said latch member to the latched position.

References Cited in the file of this patent

UNITED STATES PATENTS

| | | |
|---|---|---|
| 1,951,079 | Zihlman | Mar. 13, 1934 |
| 2,081,925 | Graf | June 1, 1937 |
| 2,527,158 | Spitalny | Oct. 24, 1950 |

FOREIGN PATENTS

| | | |
|---|---|---|
| 314,393 | Germany | Sept. 18, 1919 |
| 323,569 | Germany | Aug. 2, 1920 |
| 348,301 | Germany | Feb. 6, 1922 |
| 511,971 | Germany | Nov. 4, 1930 |
| 197,142 | Great Britain | May 10, 1923 |
| 252,108 | Switzerland | Dec. 15, 1947 |